(12) United States Patent
Thiery et al.

(10) Patent No.: US 10,103,598 B2
(45) Date of Patent: Oct. 16, 2018

(54) WET-OPERATED ARMATURE

(71) Applicant: Robert Bosch GmbH, Stuttgart (DE)

(72) Inventors: Jerome Thiery, Strasbourg (FR); Benoit Monzie, Herrlisheim (FR); Ursula Stucke, Sinzheim (DE)

(73) Assignee: Robert Bosch GmbH, Stuttgart (DE)

(*) Notice: Subject to any disclaimer, the term of this patent is extended or adjusted under 35 U.S.C. 154(b) by 300 days.

(21) Appl. No.: 14/897,563

(22) PCT Filed: Jun. 5, 2014

(86) PCT No.: PCT/EP2014/061673
§ 371 (c)(1),
(2) Date: Dec. 10, 2015

(87) PCT Pub. No.: WO2014/198622
PCT Pub. Date: Dec. 18, 2014

(65) Prior Publication Data
US 2016/0134168 A1 May 12, 2016

(30) Foreign Application Priority Data
Jun. 10, 2013 (DE) .................. 10 2013 210 726

(51) Int. Cl.
*H02K 5/12* (2006.01)
*H02K 5/128* (2006.01)
(Continued)

(52) U.S. Cl.
CPC ............ *H02K 5/128* (2013.01); *F02M 39/02* (2013.01); *H02K 5/1285* (2013.01);
(Continued)

(58) Field of Classification Search
CPC ........ H02K 5/128; H02K 5/1285; H02K 5/12; H02K 23/00
(Continued)

(56) References Cited

U.S. PATENT DOCUMENTS 3,754,844 A * 8/1973 Nusser .................. F02M 37/08
310/43
5,607,293 A * 3/1997 Luedtke ................ F02M 37/08
310/233
(Continued)

FOREIGN PATENT DOCUMENTS

CN 102377288 A 3/2012
DE 102008000248 8/2009
(Continued)

OTHER PUBLICATIONS

International Search Report for Application No. PCT/EP2014/061673 dated Aug. 10, 2015 (English Translation, 2 pages).

*Primary Examiner* — Hanh Nguyen
(74) *Attorney, Agent, or Firm* — Michael Best & Friedrich LLP

(57) ABSTRACT

The present invention relates to a wet-operated armature of an electric machine, in particular of an electric motor for a fuel pump, said armature comprising a main body and a commutator, wherein the armature is surrounded by a sleeve which fully encloses the main part and the commutator in a circumferential direction. The present invention further relates to the armature sleeve, to an electric machine comprising the armature and to a fuel pump comprising the electric machine. The present invention further relates to a method for producing the armature.

22 Claims, 10 Drawing Sheets

(51) Int. Cl.
*H02K 15/02* (2006.01)
*F02M 39/02* (2006.01)
*H02K 23/00* (2006.01)

(52) U.S. Cl.
CPC ............ *H02K 15/022* (2013.01); *H02K 5/12* (2013.01); *H02K 23/00* (2013.01); *H02K 2005/1287* (2013.01)

(58) Field of Classification Search
USPC .............................................. 310/86, 87, 88
See application file for complete search history.

(56) References Cited

U.S. PATENT DOCUMENTS 6,335,581 B1 * 1/2002 Warnke ................. F02M 37/10
310/85
2003/0107283 A1 6/2003 Suzuki et al.

FOREIGN PATENT DOCUMENTS

| GB | 1320841 | 6/1973 |
| JP | 1146472 | 2/1999 |

* cited by examiner

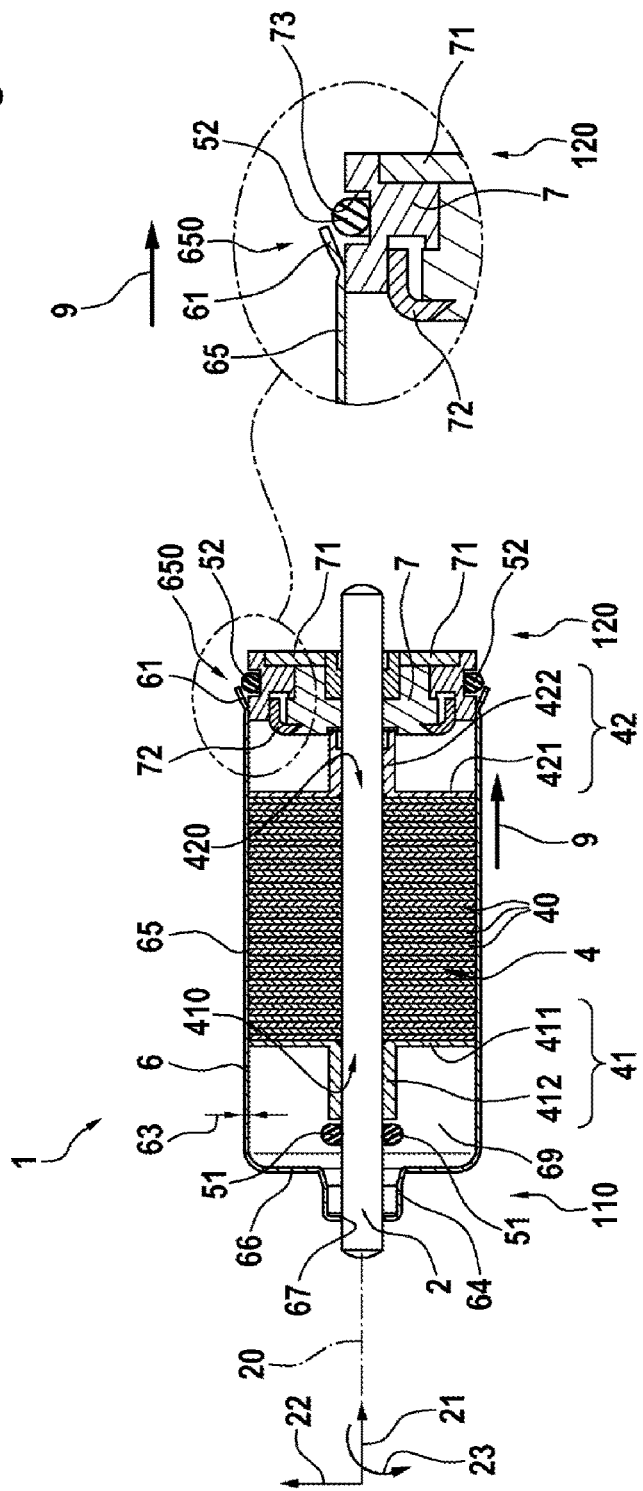

WET-OPERATED ARMATURE

BACKGROUND OF THE INVENTION

The present invention relates to a wet-operated armature for an electric machine, in particular of an electric fuel pump, and to a method for producing the armature.

Wet-operated armatures are frequently sheathed by means of a spray-coating or painting process, in order to seal them against surrounding liquid. Mostly, however, such a sealing is not completely tight. Moreover, it is often the case that the liquids that surround wet-operated armatures are electrically conductive and/or aggressive. This is the case, for example, with fuel pumps, in which the liquid is a fuel, for example (bio-)diesel or petrol.

Such liquids penetrate the hitherto known sheathings, or attack and damage the hitherto known sheathings, until the sealing is no longer assured and the windings of the armature are exposed. The latter are then attacked and damaged by the liquid, this ultimately resulting in a winding short-circuit and consequently in the failure of the motor.

SUMMARY OF THE INVENTION

It is an object of the present invention to seal, as permanently as possible, a wet-operated armature against the ingress of the liquid surrounding it, such that the armature has a longer service life, the armature nevertheless being such that it can be produced inexpensively and can be mounted easily, and the efficiency of an electric machine having this armature being unimpaired by the sheathing. It is a further object of the invention to create a method for mounting the wet-operated armature, by which the armature can be mounted easily and without subjecting the commutator to stress/damage.

Created for this purpose is a wet-operated armature of an electric machine, in particular for a fuel pump, having a main body and a commutator, which are disposed concentrically around a shaft that extends in an axial direction.

Such an armature has armature windings, which are disposed on the main body and are provided to generate an alternating electric field. Such windings are preferably produced from a cupreous metal or from copper, and are liable to corrosion. Furthermore, such an armature has fastening means for fastening the armature windings, and if necessary has contact means, which are disposed on the commutator and are produced from a metal having good conductivity, such as, for example, copper or a copper alloy, and are therefore likewise realized such that they are liable to corrosion.

The armature is distinguished in that it is surrounded by a sleeve, which fully surrounds the main body and the commutator in a circumferential direction around the axis.

The sleeve permanently prevents ingress of the liquid into its interior. As a result, the component parts of the armature disposed in the interior of the sleeve, in particular the component parts that are liable to corrosion, are permanently protected against the liquid.

In principle, such a sleeve can also be used for a non-wet-operated armature. The sleeve then has the advantage that it protects the armature against the ingress of dust and liquid.

It is preferred that the sleeve be realized in the shape of a pot. Preferably, at a first end, it has a base that extends transversely in relation to the shaft. It is furthermore preferred in this case that a shaft receiver be provided in the centre of the base. When the armature is in a mounted state the shaft extends through the shaft receiver.

Furthermore, preferably, the sleeve has a surround, which is disposed on the base and extends concentrically around the shaft. The surround preferably has an open end.

In order to supply the armature with a voltage, it is preferred that the commutator have commutator segments. The commutator segments are electrically connected to the armature windings provided to generate the alternating field. When the electric machine is in operation, the commutator segments act in combination with brushes, which are connected to a voltage source. In a preferred embodiment, the commutator segments are disposed transversely in relation to the shaft. It is likewise preferred that the commutator segments be disposed at an angle in relation to the shaft, if this is necessitated, for example, by the installation conditions. Preferably, when the armature is in the mounted state, the commutator segments are disposed at the open end of the surround of the sleeve.

In this embodiment, the sleeve surrounds the entire main body of the armature and the commutator, apart from the commutator segments, which must be accessible from the outside, in order for the armature to be supplied with the voltage. Apart from the commutator segments, the main body of the armature, with the armature windings, and the commutator are therefore disposed in the interior of the sleeve. These component parts are therefore completely separated from the liquid.

In a first preferred embodiment, the sleeve is provided such that it is flush with the commutator segments. As a result, the commutator segments are easily accessible from the outside.

In a second preferred embodiment, the sleeve projects over the commutator segments when the armature is in the mounted state. In this embodiment, the commutator segments are preferably disposed transversely in relation to the axis. It is preferred in this case that the distance of the open end of the sleeve from the commutator segments be in the range of 0.5-2 mm and/or be less than 12% of the length of the sleeve. Preferably, the distance is approximately 0.5%-12% of the length of the sleeve, particularly preferably it is 3%-7% of the length of the sleeve. It is dependent on the size of the armature. In the case of the armature being placed, with the open end of the sleeve, upon a support surface, in particular in the case of the armature being transported on a blister, or while it is being mounted, the commutator segments remain separated from the support surface by the distance. In the case of such a manipulation, therefore, the commutator segments are protected against scratching or similar damage. Since the distance is small, the commutator segments are nevertheless still easily accessible for the brushes when the armature is in the mounted state.

In a further preferred embodiment, the sleeve also projects over the brushes, which are connected to the voltage source. Owing to this metallic encapsulation, this armature further improves the EMC values (electromagnetic compatibility) values of the electric machine.

In order that the sleeve does not, or does not substantially, negatively affect the efficiency of an electric machine having this armature, it is preferred that it be produced from a non-magnetic material. Furthermore, preferably, the wall thickness of the sleeve is 0.05-1 mm, particularly preferably 0.15-0.4 mm, quite particularly preferably 0.2-0.3 mm. The sleeve is therefore of a very thin-walled design. This ensures a very small air gap between the armature and a stator of the electric machine.

In order, furthermore, to ensure that the sleeve is resistant to corrosion, it is preferred that the sleeve be produced from a high-grade steel. In this embodiment, there is no need for a retroactive galvanic coating. It is furthermore preferred that the sleeve be used as an inscription surface. Since there is no need for retroactive coating/sheathing of the sleeve, the inscription is permanently legible.

Producing the sleeve from high-grade steel has the advantage, furthermore, that high-grade steel is resistant to all known fuel media. Moreover, as compared with a conventional armature having a sheathing realized by plastic spray-coating or painting, which can melt, action of heat upon the armature, for example when a fuel pump is at a standstill, is non-critical. The metallic encapsulation additionally improves the EMC properties of the armature.

The sleeve is preferably deep-drawn, and can therefore be produced inexpensively by conventional methods.

In order to fix the sleeve, it is preferred that the armature have fixing means, by which the sleeve is fixed against axial displacement. Preferably, it is fixed to the main body by the fixing means. Furthermore, preferably, the sleeve is spaced apart from the commutator. As a result, mounting forces that act upon the sleeve, for example during flanging of the surround of the sleeve, do not act upon the commutator. The fixing is preferably effected by form closure and/or force closure, for example by welding. In a likewise preferred embodiment, the sleeve has notches as fixing means. The notches are preferably provided in the sleeve at axial ends of the main body, and secure the sleeve against displacement in the axial direction and/or against the axial direction.

Preferably, at a first end of the armature, between the sleeve and the shaft, and at a second end of the armature, between the sleeve and the commutator, a respective seal, in particular an O-ring, is provided. The seal prevents the liquids from entering the interior of the sleeve in the region of the shaft receiver of the sleeve and in the region of an open end of the sleeve. It is additionally preferred that the seal be realized so as to be elastic. Preferably, the seal is produced from an elastomer. Alternatively or additionally, however, seals realized by laser welding, adhesive bonding or liquid seals are also preferred.

At the axially opposite ends of the main body, the latter preferably has a respective terminating segment. The terminating segments are preferably integral, and are each produced from an electrically insulating material, in particular from a plastic. They have a first segment part, which bears against the main body, and which is realized in the form of a ring and extends transversely in relation to the axis. It is additionally preferred that they have a second segment part, which is disposed on the first segment part and extends along the axis. Furthermore, they each have a through-bore for receiving the shaft. In this embodiment, it is preferred that fixing means realized as notches be adjacent, respectively, to the first segment part of the terminating segments. The end of the second segment part that faces away from the first segment part is preferably used as a stop for further components, for example the commutator or an O-ring.

In a preferred embodiment, the terminating segments additionally have a third segment part, which extends along the axis, and which extends in the direction of the shaft and surrounds the main body. In this embodiment, the sleeve bears against the third segment part and is spaced apart from the main body, such that the sleeve and the main body are not in electrical contact, but isolated from each other. The third segment part of the terminating segment additionally has the advantage that it enables the main body to be pressed centrally into the sleeve. In this embodiment, it is possible, if necessary, to dispense with further fixing means.

The object is furthermore achieved by an electric machine having such a wet-operated armature. Such an electric machine is preferably an electric motor, in particular a direct-current motor or a synchronous motor. However, the invention is likewise applicable to other electric machines such as, for example, generators or starters.

The encapsulation of the component parts of the armature by the sleeve has the advantage that the armature can be balanced before the sleeve is mounted. The sleeve can be produced with great precision in respect of its dimensions by conventional methods, such that, when in the mounted state, it does not, or does not substantially, affect the unbalance of the armature.

A further advantage of the sleeve is that, during handling, it protects the components parts of the armature disposed in the interior of the sleeve against damage. Furthermore, it protects these component parts against the action of the centrifugal forces when the electric machine is in operation.

Moreover, the sleeve reduces windage losses when the electric machine is in operation, such that the latter can be operated with greater efficiency.

Finally, the sleeve prevents chips of the main body from entering the air gap between the armature and the stator.

The object is furthermore achieved by a fuel pump having an electric motor having such a wet-operated armature. The component parts of the electric motor that are liable to corrosion are permanently protected, by the sleeve, against the liquid that surrounds them. The service life of the electric motor is therefore considerably longer than the service life of conventional electric motors having a wet-operated armature. Accordingly, the service life of the fuel pump is also prolonged.

The object is furthermore achieved by a sleeve for an armature, in particular for a wet-operated armature according to the invention, the sleeve being realized in the shape of a pot and produced as a single piece. The sleeve preferably has a base, which extends transversely in relation to an axis, a surround, which is disposed on the base and extends concentrically around the axis, and a fitting aid, which is disposed on the surround and likewise extends concentrically around the axis. It surrounds an interior that is provided to receive the main body and the commutator of the armature. When the sleeve is being slid on around the main body and the commutator, the fitting aid prevents the sleeve from shearing, in particular at a seal provided at a second end of the armature.

The fitting aid is preferably a fitting chamfer, which is formed by offsetting the surround outward at an angle. In this embodiment, it can be produced in a very simple and inexpensive manner, and can be removed in the region of the angular offset, for example by means of a predetermined rupture point or by cutting. However, other fitting geometries, chamfers or radii are also preferred as a fitting aid.

Instead of removing the fitting chamfer after fitting of the sleeve, it is likewise preferred that the fitting chamfer be flanged.

Preferably, a shaft receiver is provided in the centre of the base of the sleeve. The shaft receiver preferably comprises a sealing region, which is provided to receive the seal, and comprises a through-bore. The sealing region preferably extends concentrically around the shaft. The through-bore is preferably provided in a through-bore ring that extends transversely in relation to the shaft and that is disposed at the sealing region. When the armature is in the mounted state, the seal in the sealing region is disposed in a sealing manner between the sleeve and the shaft, and the shaft extends through the through-bore. Furthermore, preferably, the surround has an open end.

When the armature is in the mounted state, the commutator is preferably disposed in the interior of the sleeve. It is preferred in this case that it be disposed at the open end of the surround, such that the commutator segments are accessible from the outside.

In order that, insofar as possible, forces acing upon the sleeve do not affect the commutator, it is preferred that the sleeve does not contact the commutator. In addition, for this purpose, it is preferred that the sleeve be fixed to the main body. As fixing means, the sleeve preferably has notches, which are provided at opposite ends of the main body and which prevent axial displacement of the sleeve.

The object is furthermore achieved by a method for producing a wet-operated armature for an electric machine, in particular for a fuel pump, wherein the armature comprises such a sleeve, having the steps:

sliding the sleeve onto the shaft, in a sliding direction, removing or flanging the fitting aid.

When the sleeve is being slid onto the shaft in the sliding direction, the shaft is guided through the shaft receiver, the main body and the commutator being disposed in the interior of the sleeve, such that they are encapsulated outwardly.

The fitting aid that remains after the sliding-on process is preferably either removed or, likewise preferably, flanged.

It is preferred that the sleeve then be secured against axial displacement. For this purpose, notches are preferably made in the sleeve, as fixing means, at opposing ends of the main body, such that no further fitting chamfer means are required, and the fixing can be realized in an inexpensive, rapid and simple manner. It is preferred that the notches allow subsequent release of the sleeve. Such a releasable fastening of the sleeve to the main body has the advantage that a fault analysis is easily realized in the case of a defective armature, since the sleeve can be demounted.

In a likewise preferred embodiment, the sleeve is fixed to the third segment parts of the terminating segments on the main body by means of central pressing. In this embodiment, it is possible to dispense with further fixing means such as, for example, notches or similar.

The sleeve can be mounted, by sliding on and, if necessary, subsequently attaching fixing means, without thermal stresses. Mounting does not require any subsequent processes in which the armature components are subjected to thermal or mechanical stresses.

The object is furthermore achieved by a use of a sleeve according to the invention as transport protection for a wet-operated armature. For this purpose, the sleeve projects over the commutator segments of the armature, when in its mounted state, at least slightly.

BRIEF DESCRIPTION OF THE DRAWINGS

The invention is described in the following on the basis of figures. The figures are merely exemplary, and do not limit the general concept of the invention.

FIG. 2(a) shows the fitting chamfer of the sleeve onto the armature from FIG. 1, FIG. 2(b) shows a detail from FIG. 2(a)

DETAILED DESCRIPTION

Figure 1:
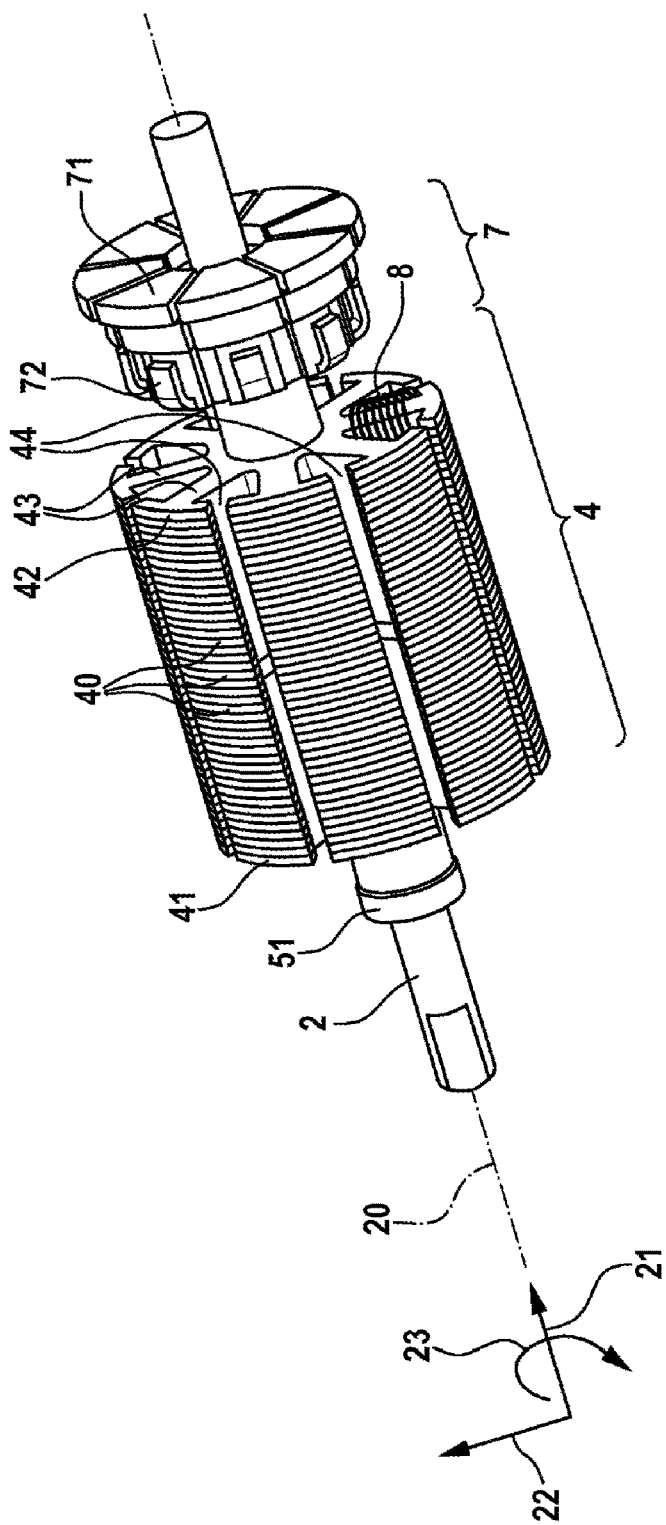
FIG. 1 shows an armature according to the invention without a sleeve, in a perspective view.

FIG. 1(a) shows an armature 1 according to the invention without a sleeve 6 surrounding it (see FIG. 2). The armature 1 comprises a commutator 7, which is provided to supply a voltage, and comprises a main body 4.

The commutator 7 and the main body 4 extend concentrically around an axis 20, and are disposed on a shaft 2, which extends along the axis 20 in an axial direction 21.

Here, the main body 4 is composed of a multiplicity of segments 40, as a segment packet. The segments 40 are contiguous with each other and connected to each other, for example, by punch-packing. In the following, the terms main body 4 and segment packet are used synonymously. The invention, however, also comprises an armature 1 having a main body composed of a solid body (not shown).

The segment packet 4 comprises a first terminating segment 41 and a second terminating segment 42, which constitute the opposing ends of the main body 4. The two terminating segments 41, 42 each have, respectively, a first segment part 411, 421, extending transversely in relation to the shaft 2, a second segment part 412, 422, having the form of a hollow cylinder, extending along the shaft 2, and a through-bore 410, 420 (see FIG. 2(a)), which is provided to receive the shaft 2. The second segment part 412, 422 serves to fit the main body 4 onto the shaft 2. The terminating segments 41, 42 are produced from an electrically insulating material, in particular a plastic.

The second segment part 412 of the first terminating segment 41 in this case constitutes a first stop for a first seal 51, which is realized as an O-ring. The second segment part 422 of the second terminating segment 42 constitutes a second stop, which bears against the commutator 7.

The main body 4 has a multiplicity of poles 43, which are uniformly distributed around the axis 20 in a circumferential direction 23, and between which pockets 44, for receiving armature windings 8, are realized in each case. Of the armature windings 8, one is shown here as an example. For the purpose of fastening the armature windings 8, fastening means 72 are provided on the commutator 7, which in this case are realized as hooks. In the following, the terms fastening means 72 and hook are used synonymously. The hooks 72 are electrically connected to commutator segments 71 of the commutator 7. The commutator segments 71 are accessible from the outside when the armature 1 is in a mounted state M (see FIG. 2(e), (g) and FIG. 3), and are provided to supply the voltage to the armature windings 8.

In order to protect the main body 4, with the armature windings 8 and the commutator 7, against contact with a liquid (not shown) surrounding the armature 1, the invention provides surrounding the armature 1 with a sleeve 6.

Figure 2D:
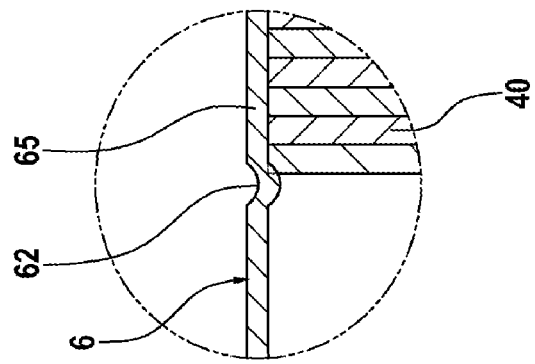
FIG. 2(d) shows a detail from FIG. 2 (c)
Figure 2C:
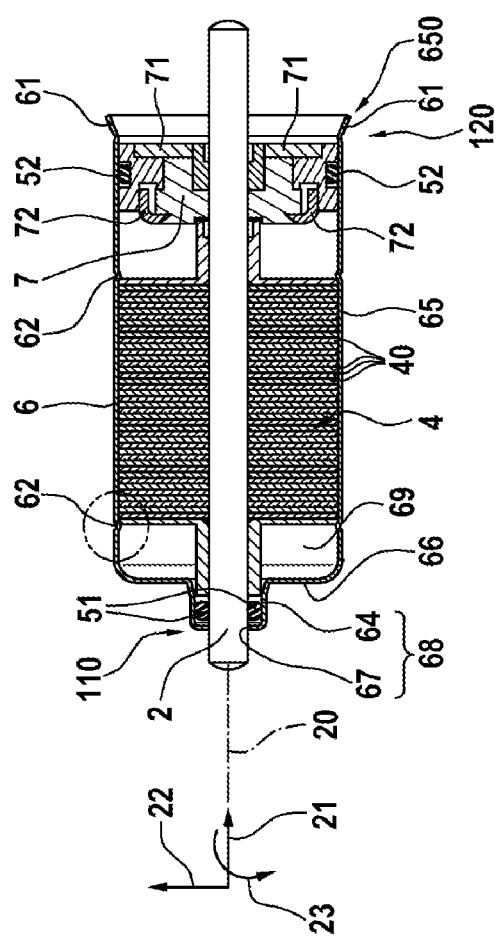
FIG. 2(c) shows the armature from FIG. 2 (a) in an intermediate state.
Figure 2E:
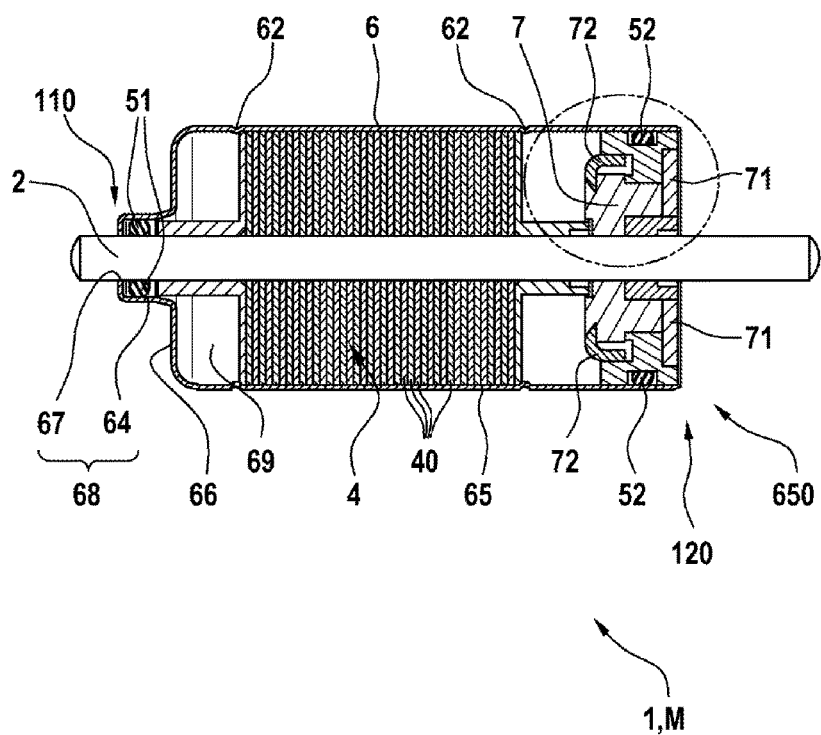
FIG. 2(e) shows the armature in the mounted state.
Figure 2F:
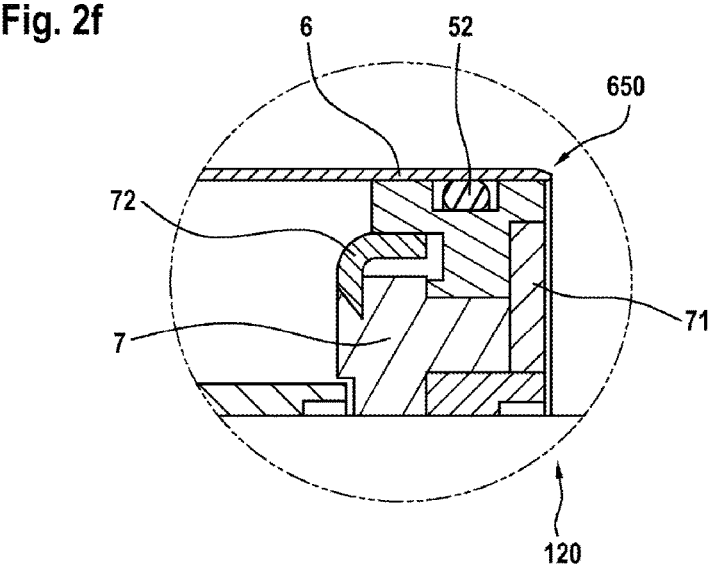
FIG. 2(f) shows a detail from FIG. 2 (e)
Figure 2G:
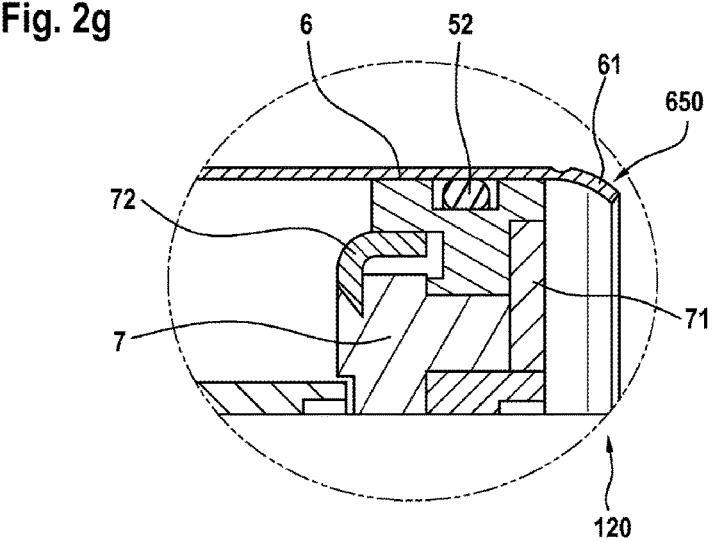
FIG. 2(g) shows a further embodiment of an armature in the mounted state, FIGS. 2(a)-(e) in each case showing a sectional representation of the armature.

FIG. 2(a) shows the fitting chamfer of the sleeve 6 onto the armature 1.

The sleeve 6 is realized in the shape of a pot, and has a base 66 extending transversely in relation to the axis 20, and a surround 65 extending in the axial direction 21. The sleeve is realized as a single piece, such that the surround 65 is disposed on the base 66. The sleeve 6 is produced, by deep-drawing, from a non-magnetic high-grade steel, and has a wall thickness 63 of approximately 0.05-1 mm. It is therefore of a very thin-walled design.

The surround 65 is realized so as to be open at an end 650 that is opposite to the base 66. Provided at this open end 650 there is a fitting aid 61, which prevents shearing of the sleeve 6 during fitting chamfer of the sleeve 6. The fitting aid 61 is formed by offsetting the surround 65 outward at an angle, such that it forms a ramp-shaped fitting chamfer. In the following, the terms fitting aid 61 and fitting chamfer 65 are used synonymously.

A shaft receiver 68 is provided in the centre of the base 66. The shaft receiver 68 comprises a sealing region 67, which extends, at least partially, along the axis 20 and which is provided to bear against the first seal 51. Additionally provided, in the centre of the shaft receiver 68, is a through-bore 67, through which the shaft 2 extends when the sleeve 6 is in the mounted state M.

The sleeve 6 surrounds an interior 69, which is provided to receive the main body 4 and the commutator 7 of the armature 1.

In the operation of fitting the sleeve 6, the latter is slid onto the main body 4 and the commutator 7, in a sliding direction 9 that extends in the axial direction 21. In this operation, the first seal 51 is fitted into the shaft receiver 68 and seals the armature 1, at a first end 110, against ingress of the liquid.

The commutator 7 is disposed at a second end 120 of the armature 1 that is opposite to the first end 110. Provided on the commutator 7, at this second end 120, there is a second seal 52, which in this case is likewise realized as an O-ring and which is disposed in a groove 73 of the commutator 7. The second seal 52 seals the interior 69, at the second end 120, against ingress of the liquid.

FIG. 2(*b*) shows the open end 650 of the sleeve 6 with its fitting aid 61, disposed at this end 650, during the operation of sliding over the second seal 52, disposed at the second end 120 of the armature 1. The fitting aid 61 prevents shearing of the sleeve 6 as it is moved over the seal 52.

FIG. 2(*c*) shows the armature 1 with a fitted sleeve 6, the fitting chamfer, realized as a fitting aid 61, still being disposed at the second end 120. The fitting chamfer 61 projects over the commutator 7 in the axial direction 21.

In addition, it can be seen that the sleeve 6 has notches, as fixing means 62, which are each disposed directly on the first segment parts 411, 412 of the first and second terminating segments 41, 42. In the following, the terms fixing means 62 and notches are used synonymously. The notches 62 fix the sleeve 6 on the main body 4, and against axial displacement. The notches 62 may be punctiform or linear, or surround the sleeve 6 around its entire circumference. FIG. 2(*d*) shows a detail from the armature 1 in the region of the first segment part 411 of the first terminating segment 41, in which the notch 62 disposed therein is represented.

FIG. 2(*e*) shows a first embodiment of an armature 1 in the mounted state M. At the second end 120 of the armature 1, the fitting aid 61 has been removed, such that the surround 65, without the fitting aid 61, now constitutes the open end 650 of the sleeve 6. It can be seen that the commutator segments 71 extend transversely in relation to the axis 20 and are easily accessible from the outside. However, the open end 650 of the sleeve 6 projects over the commutator segments 71 (see, in connection therewith, FIG. 5(*a*)).

FIG. 2(*f*) shows an enlarged detail from FIG. 2(*e*), at the second end 120 of the armature 1.

FIG. 2(*g*) shows an enlarged detail of a further embodiment of an armature 1 in the mounted state M, at its second end 120. In this embodiment, the fitting aid has been flanged inward, the flanging not contacting the commutator. As a result, the commutator is not subjected to radial forces during the flanging operation.

Figure 3A:
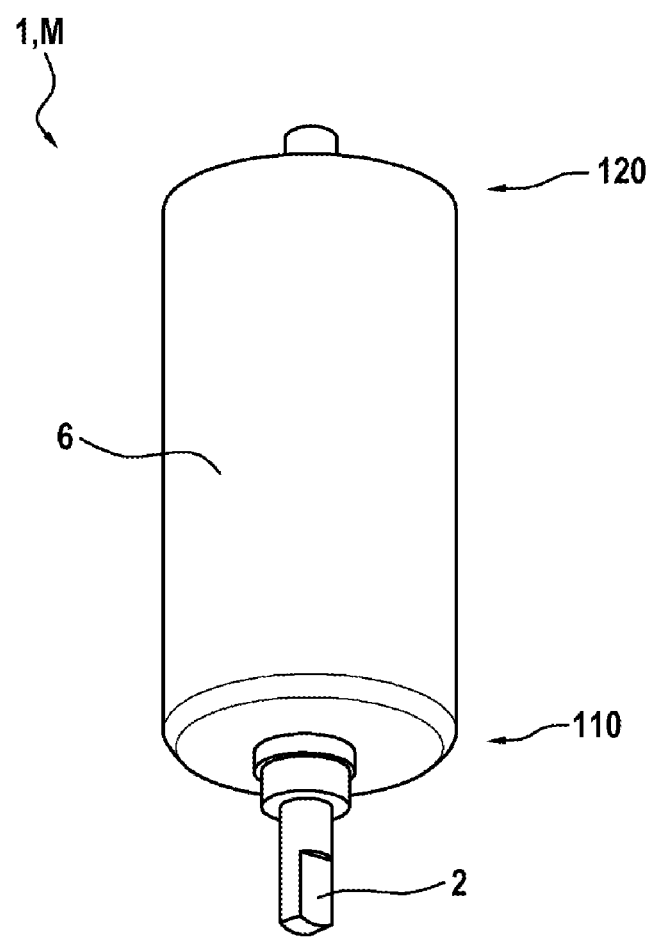
FIG. 3(a) and FIG. 3(b) show an armature according to the invention in the mounted state, in differing perspective views.
Figure 3B:
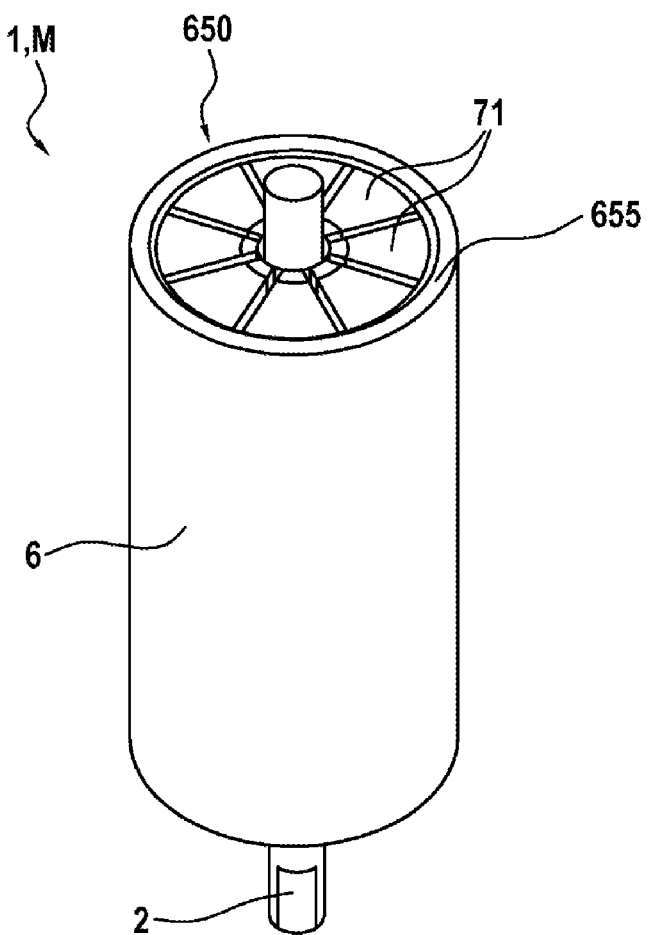

FIG. 3 shows, in (a) and (b), perspective views of a further embodiment of a wet-operated armature 1 according to the invention in the mounted state M. In the case of this armature 1, likewise, only the commutator segments 71 at the second end 120 of the armature 1 are not surrounded by the sleeve in a sealing manner. The armature 1 differs from the armature 1 of the embodiment of FIG. 2(*e*) in that the fitting aid 61 is flanged. In the case of this armature, the flanging 655 extends transversely in relation to the axis 20.

Figure 4:
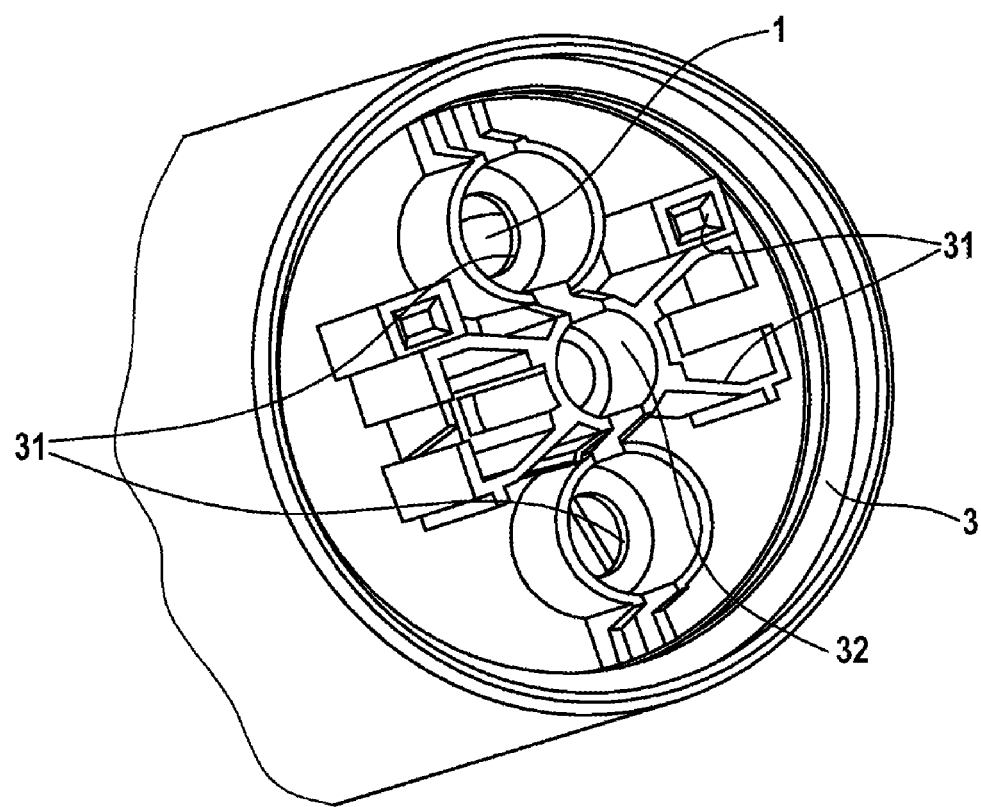
FIG. 4 shows the armature from FIG. 3 when being fitted into a housing that surrounds it.

FIG. 4 shows the armature 1 from FIG. 3 during the operation of fitting into a housing 3 that surrounds it. The housing 3 has a multiplicity of recesses 31 for electrical contacts (not shown), in particular brushes, and has a through-bore 32, which serves as a shaft receiver for the shaft 2.

Figure 5A:
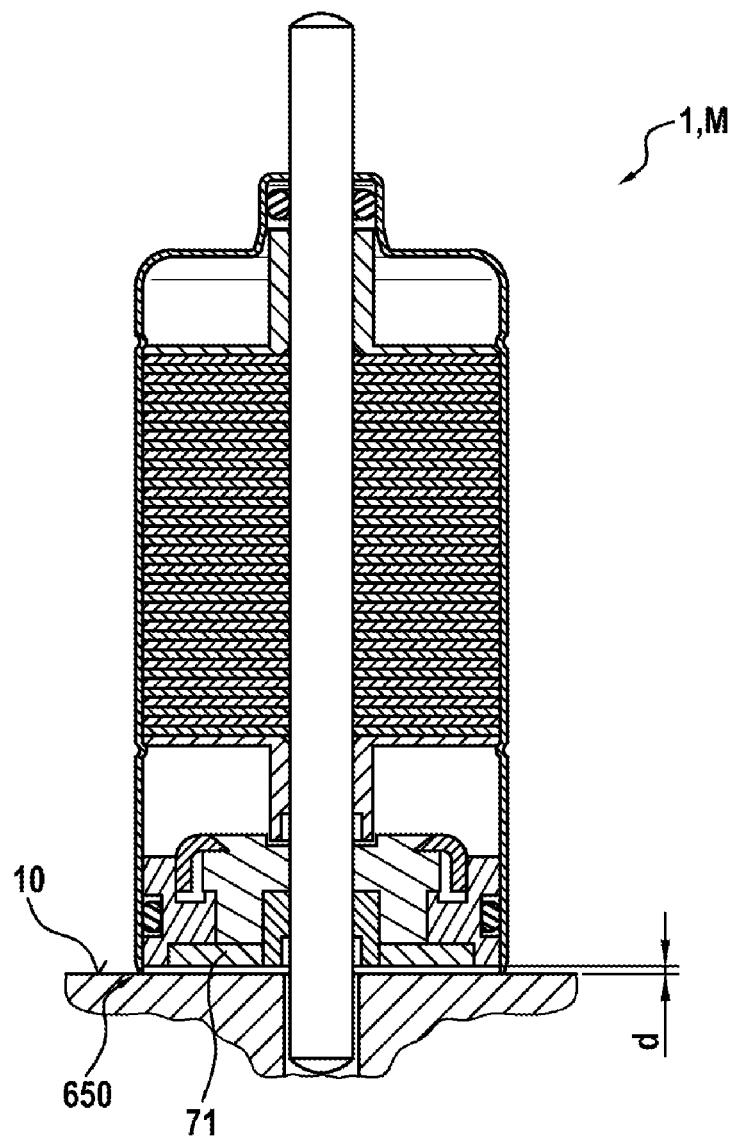
FIG. 5(a) shows the armature from FIG. 2(e) placed on a support surface, and, FIG. 5(b) shows a further embodiment of an armature according to the invention in the mounted state.
Figure 5B:
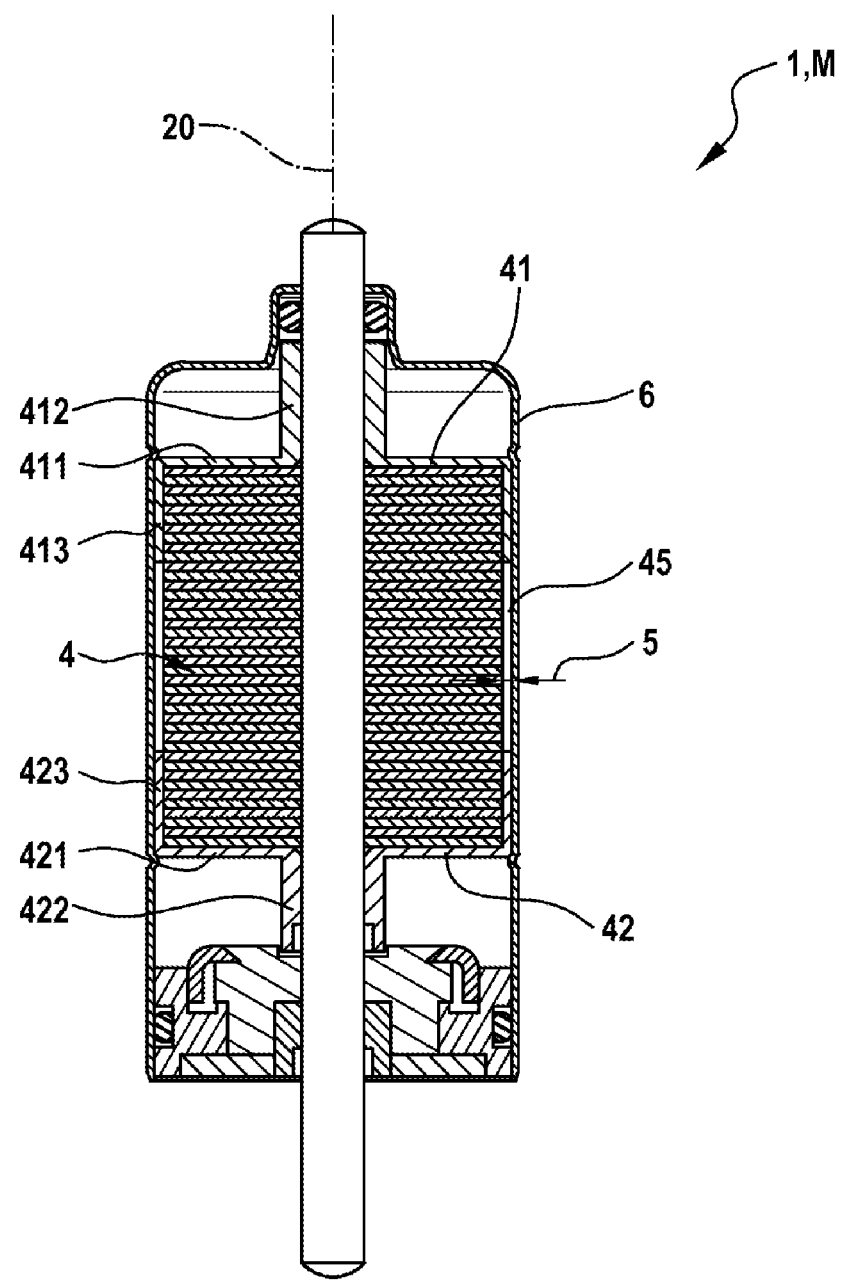

FIG. 5 shows, in (a), the armature 1 of FIG. 2(*e*) when fully mounted. The armature 1 has been set down on a support surface 10, for example a blister, such that the open end 650 of the sleeve 6 rests on the support surface 10. Since, in the case of this embodiment of the armature 1, the sleeve 6 projects over the commutator 7, the commutator segments 71 do not rest on the support surface 10, but are separated from the latter by the distance d between the open end 650 of the sleeve 6 and the commutator segments 71. Such an arrangement is obtained, for example, if the armature 1 is transported in a blister 10. When the armature 1 is set down onto the sleeve 6, commutator segments 71 are protected against scratching, by the distance d, since the sleeve projects over the commutator segments by the distance d.

FIG. 5(*a*) shows an armature 1, in which the fitting aid 61 has been removed from the sleeve 6 (see FIG. 2(*f*)). In the case of a flanged fitting aid 61 (see FIG. 2(*g*)), the distance d is correspondingly greater.

FIG. 5(*b*) shows a further embodiment of an armature 1, in which the terminating segments 41, 42 each have a third segment part 413, 423, in addition to the first and second segment parts 411, 421, 412, 422. The third segment part 413, 423 of the terminating segments 41, 42 in each case extends in the direction of the axis 20 and surrounds the segment packet 4. It is made, respectively, from an electrically insulating material, in particular from a plastic, so as to be integral with the first and second segment parts 411, 421, 412, 422. In this embodiment, the sleeve 6 is spaced apart, by a gap 45, from the part of the segment packet 4 that is realized so as to be electrically conductive. This distance s is dimensioned such that it allows the sleeve 6 to be pressed centrally onto the terminating segments 41, 42. In this, the sleeve 6 is electrically isolated from the segment packet 4.

The invention claimed is:

1. A wet-operated armature (1) of an electric machine, comprising a main body (4) and a commutator (7), which are disposed concentrically around a shaft (2) that extends in an axial direction (21), characterized in that the main body and the commutator are surrounded by a sleeve (6), which fully surrounds the main body (4) and the commutator (7) in a circumferential direction (23) around the shaft (2), wherein the sleeve (6) is in the shape of a pot and has a base (66) that extends transversely in relation to the shaft (2), and wherein the sleeve (6) has a surround (65) disposed on the base (66), wherein the surround (65) extends concentrically around the shaft (2) and has an open end (65) opposite the base (4), and wherein the surround (65) has no openings between the open end (65) and the base (66).

2. The wet-operated armature (1) as claimed in claim 1, characterized in that the commutator (7) has commutator segments (71), which are disposed transversely in relation to the shaft (2).

3. The wet-operated armature (1) as claimed in claim 1, characterized in that the sleeve (6) is produced from a non-magnetic metal.

4. The wet-operated armature (1) as claimed in claim 1, characterized in that the sleeve (6) has a wall thickness (63) of 0.05-0.5 mm.

5. The wet-operated armature (1) as claimed in claim 1, characterized in that the sleeve (6) is deep-drawn.

6. The wet-operated armature (1) as claimed in claim 1, characterized in that the armature has fixing means (62), by which the sleeve (6) is fixed against axial displacement.

7. An electric machine having a wet-operated armature (1) as claimed in claim 1.

8. A fuel pump having an electric motor, which has a wet-operated armature as claimed in claim 1.

9. The wet-operated armature (1) as claimed in claim 1, wherein the sleeve (6) is produced as a single piece, and wherein the base (66) extends transversely in relation to an axis (20), the surround (65) extends concentrically around the axis (20), and the sleeve further includes a fitting aid (61), which is disposed on the surround (65) and extends concentrically around the axis (20).

10. The sleeve as claimed in claim 9, characterized in that the fitting aid (61) is a fitting chamfer, which is formed by offsetting the surround (65) outward at an angle.

11. The wet-operated armature (1) as claimed in claim 1, characterized in that the sleeve (6) is produced from non-magnetic high-grade steel.

12. The wet-operated armature (1) as claimed in claim 1, characterized in that the sleeve (6) has a wall thickness (63) of 0.15-0.4 mm.

13. The wet-operated armature (1) as claimed in claim 1, characterized in that the armature has fixing means (62), by which the sleeve (6) is fixed against axial displacement, on the main body (4).

14. The wet-operated armature (1) as claimed in claim 1, wherein the sleeve (6) surrounds the main body (4) and the commutator (7) such that the sleeve (6) prevents ingress of a liquid into the main body (4) and the commutator (7).

15. The wet operated armature (1) as claimed in claim 1, characterized in that the main body (4) and the commutator (7) are completely inside the sleeve (6).

16. A wet-operated armature (1) of an electric machine, comprising a main body (4) and a commutator (7), which are disposed concentrically around a shaft (2) that extends in an axial direction (21), characterized in that the armature (1) is surrounded by a sleeve (6), which fully surrounds the main body (4) and the commutator (7) in a circumferential direction (23) around the shaft (2) wherein, at a first end (HO) of the armature (1), between the sleeve (6) and the shaft (2), and at a second end (120) of the armature (1), between the sleeve (6) and the commutator (7), a respective seal is provided.

17. The wet-operated armature (1) as claimed in claim 16, wherein the seal is an O-ring (51, 52).

18. The wet-operated armature (1) as claimed in claim 16, wherein the seal prevents ingress of a liquid into the sleeve (6).

19. A wet-operated armature (1) of an electric machine configured to be surrounded by liquid, comprising:
    a main body (4);
    a commutator (7), wherein the main body (4) and the commutator (7) are disposed concentrically around a shaft (2) that extends in an axial direction (21); and
    a sleeve defining an interior (69) in which the main body (4) and the commutator (7) are positioned, wherein the sleeve (6) is in the shape of a pot and has a base (66) that extends transversely in relation to the shaft (2), and wherein the sleeve (6) has a surround (65) disposed on the base (66), wherein the surround (65) extends concentrically around the shaft (2) and has an open end (65) opposite the base (4), and wherein the sleeve (6) prevents ingress of a liquid into the interior (69) of the sleeve (6).

20. The wet-operated armature (1) as claimed in claim 19, characterized in that the sleeve (6) is produced from non-magnetic high-grade steel.

21. The wet-operated armature (1) as claimed in claim 19, characterized in that the sleeve (6) has a wall thickness (63) of 0.15-0.4 mm.

22. The wet operated armature (1) as claimed in claim 19, characterized in that the main body (4) and the commutator (7) are completely inside the sleeve (6).

* * * * *